May 1, 1951 E. E. HALLANDER Re. 23,362

SPRING-APPLIED ELECTROMAGNETIC RELEASED BRAKE

Original Filed Jan. 14, 1949 4 Sheets-Sheet 1

Inventor:
ELVIN E. HALLANDER
BY
Harry V. Cook,
Attorney.

SPRING-APPLIED ELECTROMAGNETIC RELEASED BRAKE

Original Filed Jan. 14, 1949 4 Sheets-Sheet 2

Inventor:
ELVIN E. HALLANDER,
BY
Harry N. Cook
Attorney.

SPRING-APPLIED ELECTROMAGNETIC RELEASED BRAKE
Original Filed Jan. 14, 1949 4 Sheets-Sheet 3
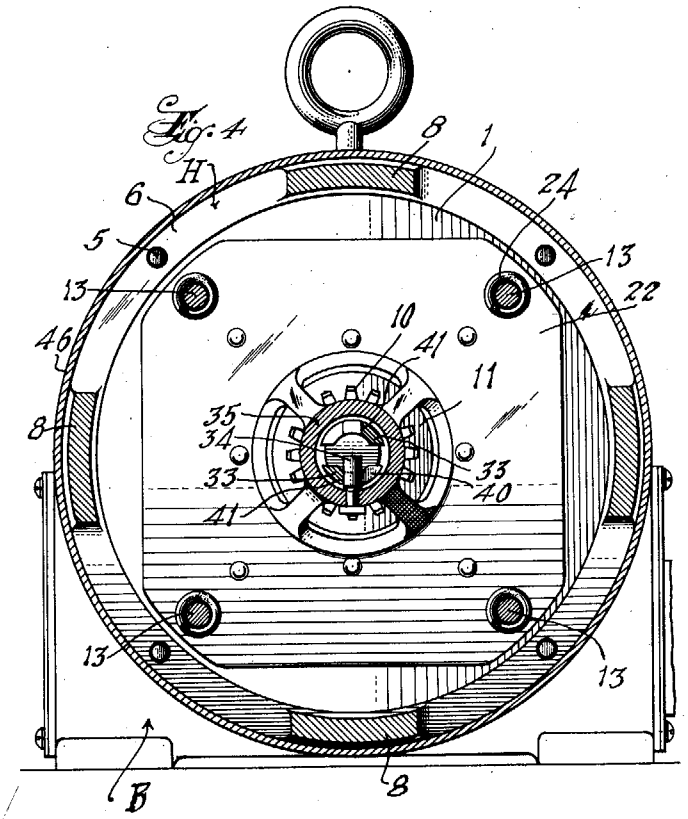
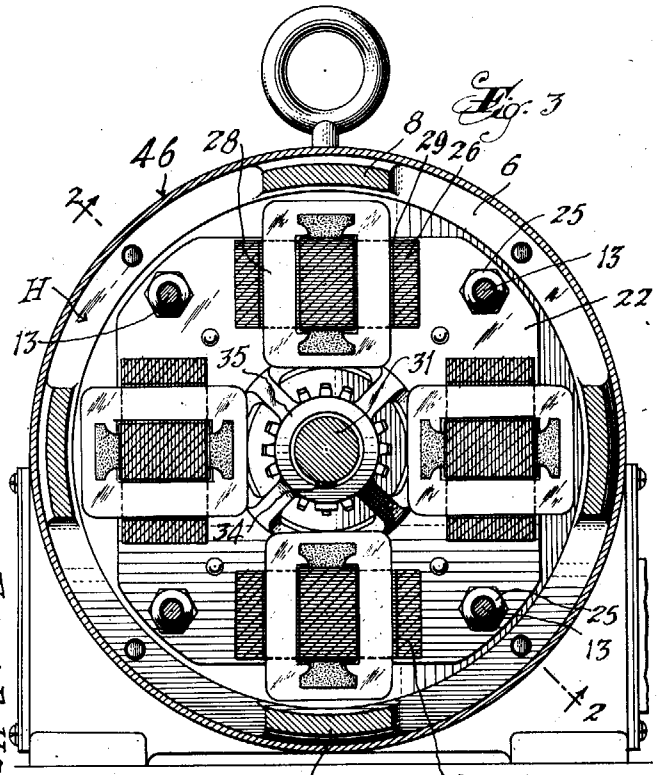
Inventor:
ELVIN E. HALLANDER,
BY Harry N. Cook, Attorney.

SPRING-APPLIED ELECTROMAGNETIC RELEASED BRAKE
Original Filed Jan. 14, 1949 4 Sheets-Sheet 4
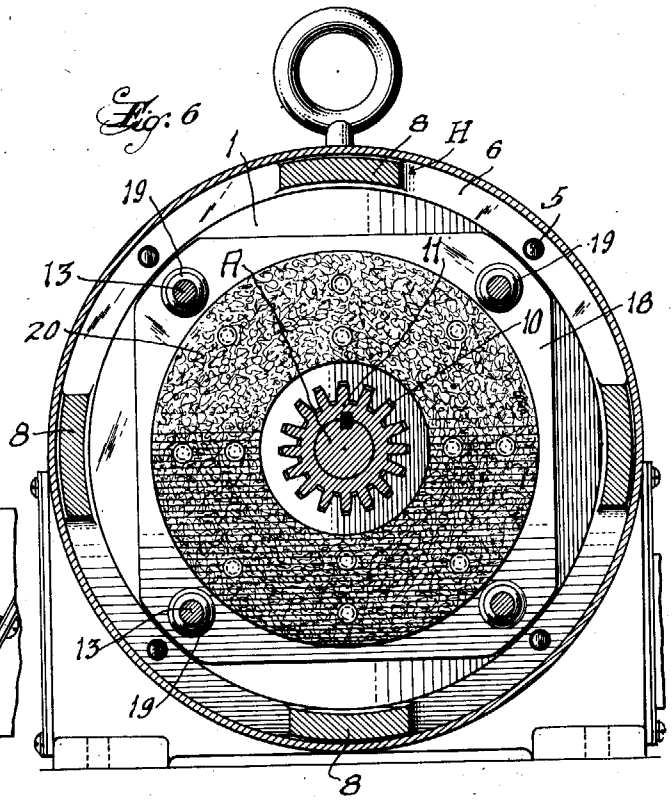
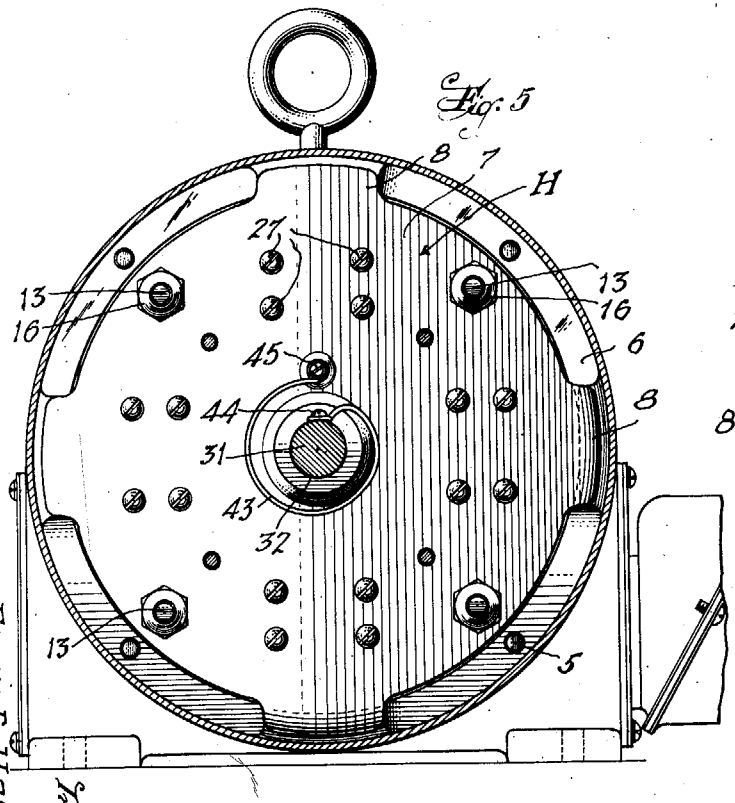
Inventor:
ELVIN E. HALLANDER,
BY Harry B. Cook, Attorney.

Reissued May 1, 1951 Re. 23,362

UNITED STATES PATENT OFFICE 23,362

SPRING-APPLIED ELECTROMAGNETIC RELEASED BRAKE

Elvin E. Hallander, La Crosse, Wis., assignor, by mesne assignments, to Miehle Printing Press and Manufacturing Company, Chicago, Ill., a corporation of Delaware Original No. 2,512,565, dated June 20, 1950, Serial No. 70,840, January 14, 1949. Application for reissue March 10, 1951, Serial No. 214,895

3 Claims. (Cl. 188—171)

Matter enclosed in heavy brackets [ ] appears in the original patent but forms no part of this reissue specification; matter printed in italics indicates the additions made by reissue.

This invention relates to braking equipment of the type wherein the brake is automatically set or applied as by spring pressure, and is electromagnetically released. More particularly, the invention contemplates brakes which include one or more friction elements, such as disks or rings, certain of which are mounted on a rotating element to be braked and others of which are mounted on a stationary support, such as the frame of a machine of which said rotating element is a part, in combination with electromagnetic means of the solenoid type including a solenoid, winding or coil having a fixed core, and an armature therefor, one of which is mounted on the frame of the machine while the other is operatively connected to said friction elements, said armature being normally held in spaced relation to said core of the solenoid and said friction elements being held in frictional contact with predetermined pressure by spring mechanism to set or apply the brake and hold said electrically driven part at rest, and said armature being attracted to said core and causing actuation of said friction elements out of contact with each other upon energization of said solenoids. The invention has special use in brake motors where said rotating element is the shaft of an electric motor and said solenoids are energized automatically upon the supply of current to the motor for starting the same.

A prime object of the invention is to provide a brake motor of this character which shall include novel and improved means for manually releasing the brake, that is, for manually causing actuation of said friction elements out of contact with each other, whereby the brake may be manually released but at the same time adequate space or air gap between the armatures and the cores of the electromagnets shall be ensured to permit subsequent automatic resetting of the brake, that is, actuation of the friction elements into contact with each other.

In many known brake motors, the brake mechanism is so mounted with respect to the motor that accidental blows against or jars of the brake mechanism may throw the latter out of adjustment; and therefore another object of my invention is to provide a novel and improved construction, combination and arrangement of an electric motor frame or housing and brake mechanism for the motor, whereby the possibility of dislocation of or disturbance of normal relation between the friction elements on the motor shaft and the other friction elements, shall be reduced to the minimum.

A further object is to provide braking equipment of the character described which can be applied to and removed from the frame of an electric motor or other machine as a unit, whereby the installation, adjustment, and repair of the brake mechanism can be effected easily and quickly.

Other objects of the invention are to provide a novel and improved construction, combination and arrangement of the friction elements, the armatures and the cores of the electromagnets, whereby even seating of the armature on the cores of the magnets can be ensured with consequent smooth operation and a minimum of chatter or vibration of the parts; and to obtain other advantages and results that will be brought out by the following description in conjunction with the accompanying drawings, in which Figure 1 is a central vertical longitudinal sectional view through a brake motor including braking equipment constructed in accordance with the invention;

Figure 3 is a transverse vertical sectional view, approximately on the plane of the line 3—3 of Figure 1;

Figure 1:
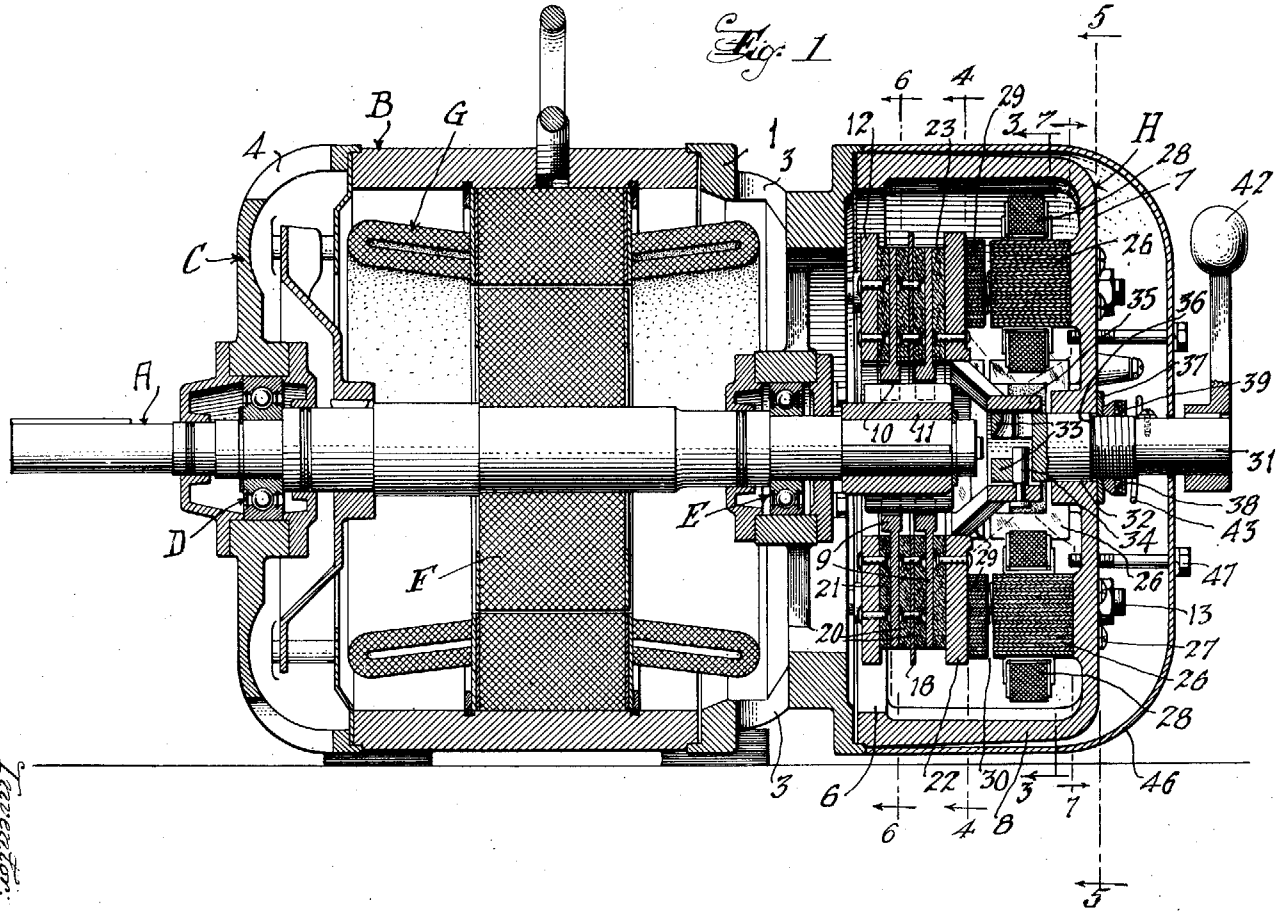
Figures 2, 7, 8, 9:
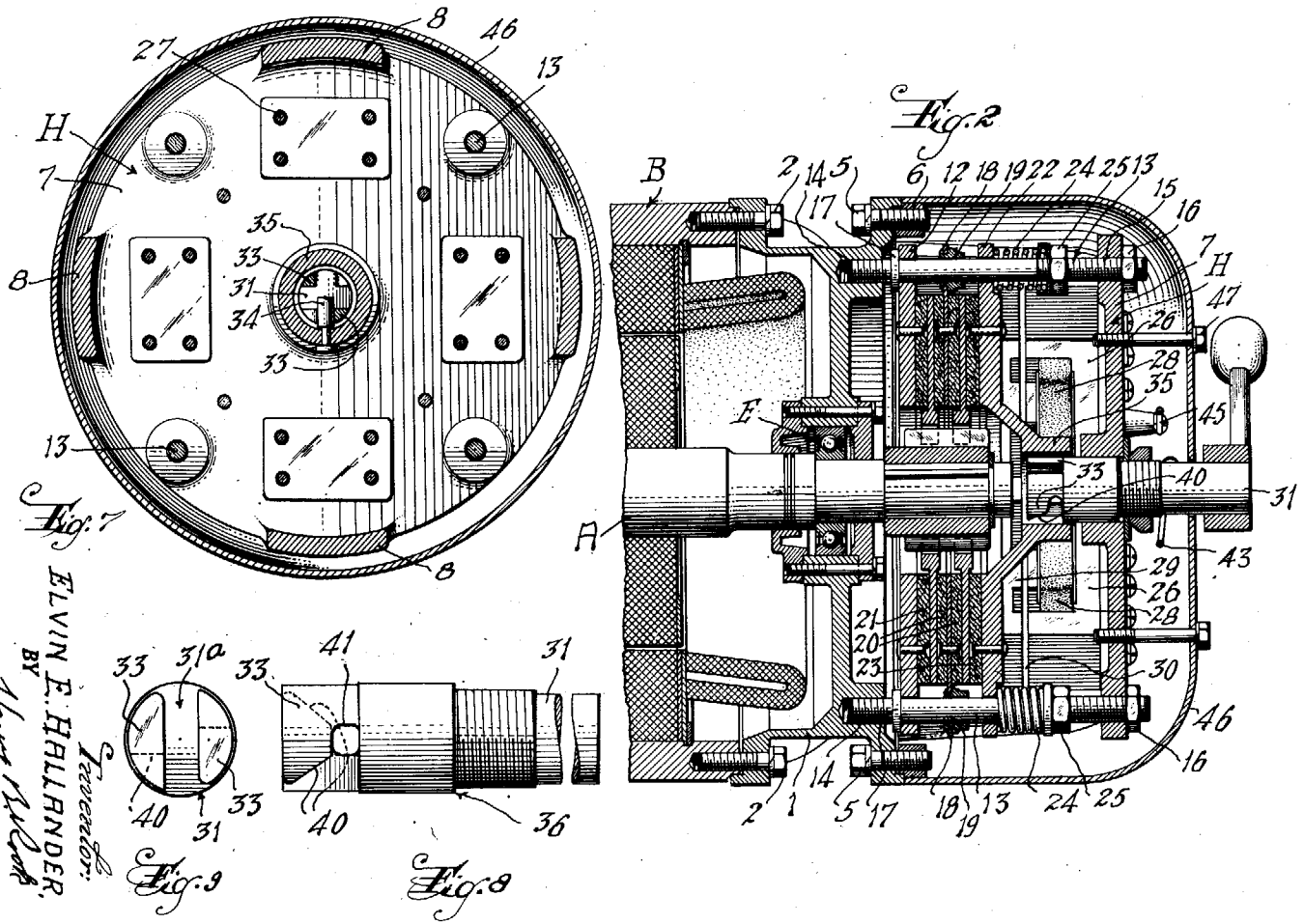
Figure 2 is a fragmentary longitudinal sectional view, approximately on the plane of the line 2—2 of Figure 3.

Figures 4, 5 and 6 are transverse vertical sectional views, approximately on the planes of the respective lines 4—4, 5—5 and 6—6 of Figure 1;

Figure 7 is a similar view, approximately on the plane of the line 7—7 of Figure 1;

Figure 8 is an enlarged fragmentary detached side elevational view of the actuating shaft of the manual release mechanism, and Figure 9 is an end elevational view thereof.

Specifically describing the invention, the reference character A designates the rotating part to be braked, which in the present instance is the shaft of an electric motor which includes a housing B having an end cover C in which is one bearing D for the shaft A, the other bearing E for which is mounted in an adaptor ring I which serves both as an end cover for the motor housing B and as a mount for the brake mechanism. The adaptor ring I may be secured to the motor housing in any suitable manner, as by means of cap screws 2, and the ring preferably has circumferentially spaced openings 3 therein which with similarly spaced openings 4 in the end cover C provide ventilation for the armature F and field windings G of the motor.

Concentric with and secured to the end of the mounting ring 1 opposite the motor by any suitable means such as cap screws 5, is a support cage H for certain parts of the brake unit. As shown, this cage comprises a base ring 6 which is connected to an end plate 7, preferably by integral struts 8. As shown, the end plate 7 is approximately flat and its general plane is parallel to the general plane of the base ring 6, while the struts 8 are preferably equidistantly circumferentially spaced apart.

The cage H is coaxial with the shaft A and one end of the shaft projects into the cage and has a plurality of brake disks 9 mounted thereon to rotate therewith but capable of movement longitudinally thereof. As shown, the disks have a feather and spline connection 10 with a hub 11 which is keyed or otherwise fastened on the shaft to rotate therewith. At one side of one of the friction disks is a thrust-resisting friction plate 12 that is mounted on support rods 13 each of which has one end secured in the adaptor ring 1, as by a screw threaded connection 14, and its other end extends through an opening 15 in the end plate 7, lock nuts 16 preferably being threaded on the rods to permit rotation and longitudinal adjustment of the rods relatively to the mounting plate and the base plate and to lock them in adjusted position. Each of the rods 13 has a shoulder or collar 17 against which the thrust-resisting plate 12 abuts.

At the other side of said brake disk 9 opposite the thrust-resisting plate 12 is a floating friction plate 18 that is slidably mounted at 19 on the rods 13 so as to be free for movement transversely of itself and longitudinally of the rods. At its opposite sides, the friction plate 18 has layers of suitable friction material 20 secured thereon, and the plate 12 has a similar layer of friction material 21 to frictionally cooperate with the adjacent brake disk 9.

The other brake disk 9 is disposed between the friction plate 18 and a presser plate 22 which has a layer of friction material 23 to frictionally cooperate with the brake disk. The presser plate 22 is also slidably mounted on the support rods 13, and compression springs 24 are interposed between said presser plate and an adjustable nut 25 on each of the studs.

With this construction, it will be observed that the springs 24 will normally press the juxtaposed friction elements of the brake into frictional contact with each other, the pressure depending upon the force exerted by the springs 24 which can be adjusted by the nuts 25. Therefore, normally the brake is automatically applied and the shaft A is held against rotation.

For automatically releasing the brake, a plurality of electromagnets are provided, and preferably these magnets are energized automatically upon supply of electricity to the motor for starting the same. As shown, there are four of these magnets, each comprising a laminated core 26 secured on the inner side of the end plate of the cage by any suitable means, such as screws 27, each core being surrounded by a coil or winding 28 which may be connected in the motor circuit in known manner to accomplish the above described purpose. Cooperating with each of the cores 28 is an armature 29 which is rigidly mounted on the presser plate. The juxtaposed ends of the cores and armatures are preferably flat and in a common plane, perpendicular to the axis of the shaft A and approximately parallel to the planes of the frictional elements 9, 12, 18, 22; and normally, the armatures are spaced from the cores a substantial distance as best shown in Figure 1, where the spaces are designated 30 and provide air gaps between the cores and armatures. Upon energization of the windings 28, the armatures are magnetically attracted to the cores against the influence of the springs 24 so as to release the brake and permit free rotation of the motor shaft A; and when the windings 28 are deenergized, the springs 24 automatically apply the brake by forcing the friction elements into frictional engagement with each other so as to stop the rotation of the motor shaft.

Another feature of my invention is means for manually releasing and holding the brake in released position and at the same time leaving a space between the cores and the armatures to permit the brake to be automatically electromagnetically applied. As shown, this manual releasing means comprises an actuating shaft 31 which is rotatably mounted in an opening 32 in the end plate 7 of the cage H, coaxially with the friction elements, said shaft having a diametrical slot 31a opening through its inner end and also having at least one cam finger 33 at one side of said slot to cooperate with a stud 34 that is mounted in a tubular hub 35 on the presser plate 22. Two fingers are shown to permit use of two studs, if desired. The actuating shaft 31 is rotatable but has limited longitudinal movement in the end plate 7, and as shown, the shaft has a shoulder 36 disposed at one side of a plate 37 that is secured to the outer side of the end plate 7 and through which the shaft 31 projects, and said shaft has a nut 38 thereon at the opposite side of the plate 37, said nut being locked in adjusted position in any suitable manner as by set screws 39.

When the brake is in normal or applied condition, the stud 34 is disposed in the slot 31a and in the path of rotation of the inclined or cam surface 40 of one of the cam fingers 33, so that upon rotation of the actuating shaft 31 in one direction, the pin will be engaged by said cam surface 40 of one of the fingers 33 and pulled toward the outer end of said actuating shaft so as to draw the presser plate 22 away from the other friction elements, and this operation will continue until the pin becomes seated in a notch 41 in said cam finger, whereupon the presser plate will be positively held in brake-releasing position and return rotation of the shaft 31 will be prevented by the frictional contact between the pin 31 and the cam finger 33 caused by the springs 24.

For manually rotating the shaft 31 I have provided a finger-piece or lever 42, and preferably a spring 43 is provided for rotating the shaft into normal position, such rotation being limited by abutment of the slot side of the finger with the stud. As shown, this spring is spiral in shape and has one end connected to the shaft 31, as at 44, and its other end connected to the end plate 7 of the cage, as indicated at 45.

The cam fingers 33 are of such shape and proportions that when the brake is in manually released position, as shown in Figure 1, the armatures 29 will be in spaced relation to the cores 26 of the electromagnets, whereby when the electromagnets are energized, for example, upon starting of the motor, the presser plate 22 will be pulled a little farther into its releasing position and thereby move the stud 34 out of frictional engagement with the cam finger 33 of the actuating shaft, whereupon said actuating shaft will be returned to its neutral position by the spring 43. Thus, the brake is held automatically and electromagnetically so that when the electric current is next cut off from the windings 28, for example, upon stopping of the motor, the brake will be automatically applied by the springs 24.

Preferably, a cover 46 is applied over the moving parts of the brake mechanism, and as shown, said cover telescopically engages the base ring 6 of the cage H and is secured to the end plate 7 by cap screws 47.

It will be seen by those skilled in the art that the brake mechanism can be easily and quickly mounted on the motor housing as a unit and in properly adjusted condition, and that the parts of the brake will be rigidly held in proper adjusted relation to the shaft A. The mounting of the friction elements 12, 18 and 22 on the rods 13 and the secure rigid mounting of the rods 13 at both ends in the adaptor ring 1 and the end plate 7 of the cage H, respectively, reduce to the minimum the possibility of disturbance of the adjustment of the brake by blows against or jars of the brake mechanism.

While I have shown and described the invention as embodied in certain details of construction, it should be understood that this is primarily for the purpose of illustrating the principles of the invention and that many modifications and changes can be made in the construction of the brake mechanism and motor within the spirit and scope of the invention.

Having thus described the invention, what I claim is:

1. In combination with a machine housing and a rotary shaft journaled therein and projecting from one end thereof, a brake disk on said shaft to rotate therewith, friction plates at opposite sides of said brake disk, spring mechanism for normally actuating at least one of said plates in one direction toward the other to clamp said brake disk between said plates and thereby apply the brake, electromagnetic means including a coil for actuating said one of said plates in the opposite direction to release said brake disk, manually operable means for actuating said plate in the second-mentioned direction to release said brake disk independently of said electromagnetic means, means for holding said friction plate in said position to release said brake disk, and means for causing release of said friction plate from said holding means automatically upon energization of said coil to permit automatic clamping of said brake disk upon subsequent deenergization of said coil to apply the brake 2. In a combination as defined in claim 1, said electromagnetic means comprising at least one core having a coil thereon and an armature to be electromagnetically drawn toward said core upon energization of said coil, one of said core and said armature being mounted on said friction plate and the other being mounted on a fixed support and normally disposed with an air gap between them, and said manually operable means and said friction plate having relatively movable cooperative portions for actuating said friction plate to release said brake disk and maintain a portion of said air gap so as to permit further movement of said armature toward said core upon subsequent energization of said coil [,means for holding said friction plate in said position to release said brake disk, and means for causing release of said friction plate from said holding means automatically upon energization of said coil to permit automatic clamping of said brake disk upon subsequent deenergization of said coil to apply the brake].

3. In a combination as defined in claim 2, said manually operable means including a movable part movable in one direction upon operation of said manually operable means, [the addition of means for holding said friction plate in said position to release said brake disk, means for causing release of said friction plate from said holding means automatically upon energization of said coil to permit automatic clamping of said brake disk upon subsequent deenergization of said coil to apply the brake,] said holding means including a stud on said friction plate and a notch in said movable part in contact with one side of which said stud is held by force applied to said friction plate by said spring mechanism, and the last-named means including a spring for actuating said movable part in the other direction, whereby upon energization of said coil after manual release of said brake disk said stud will be moved out of contact with said movable part and the latter will be moved relatively to said stud to permit movement of said friction plate in the direction to clamp said brake disk upon deenergization of said coil.

ELVIN E. HALLANDER.

REFERENCES CITED

The following references are of record in the file of this patent or the original patent:

UNITED STATES PATENTS

| Number | Name | Date |
|---|---|---|
| 1,154,791 | Marr | Sept. 28, 1915 |
| 2,059,028 | Price | Oct. 27, 1936 |
| 2,121,889 | Sousedik | June 28, 1938 |

FOREIGN PATENTS

| Number | Country | Date |
|---|---|---|
| 456,678 | Great Britain | Nov. 13, 1936 |